US011979187B2

(12) United States Patent
Wendt et al.

(10) Patent No.: US 11,979,187 B2
(45) Date of Patent: May 7, 2024

(54) LIFI POWER MANAGEMENT

(71) Applicant: SIGNIFY HOLDING B.V., Eindhoven (NL)

(72) Inventors: Matthias Wendt, Wurselen (DE); Karnekumar Arulandu, Breda (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 9 days.

(21) Appl. No.: 17/790,909

(22) PCT Filed: Jan. 8, 2021

(86) PCT No.: PCT/EP2021/050271
§ 371 (c)(1),
(2) Date: Jul. 5, 2022

(87) PCT Pub. No.: WO2021/144202
PCT Pub. Date: Jul. 22, 2021

(65) Prior Publication Data
US 2023/0058596 A1 Feb. 23, 2023

(30) Foreign Application Priority Data
Jan. 13, 2020 (EP) .................................... 20151370

(51) Int. Cl.
*H04B 10/00* (2013.01)
*H04B 10/114* (2013.01)
*H04B 10/116* (2013.01)

(52) U.S. Cl.
CPC ......... *H04B 10/116* (2013.01); *H04B 10/114* (2013.01)

(58) Field of Classification Search
CPC . H04B 10/112; H04B 10/1123; H04B 10/114; H04B 10/1143; H04B 10/1149;
(Continued)

(56) References Cited

U.S. PATENT DOCUMENTS 8,208,818 B2 6/2012 Sasai
11,190,275 B2 * 11/2021 Afgani ............... H04B 10/1143
(Continued)

FOREIGN PATENT DOCUMENTS

WO 2018229022 A1 12/2018
WO 2019002884 A1 1/2019

*Primary Examiner* — Hanh Phan

(57) ABSTRACT

A node (200) is provided for use in a LiFi system (100) to provide LiFi signals to an endpoint device (130). The node (200) comprises a visible light source (220) for emitting modulated visible light and non-modulated visible light to provide illumination, and an infrared light source (210) for emitting modulated infrared light. The node (200) is configured to output a LiFi signal at a first one or more frequencies via the infrared light source (210) for reception by said endpoint device (130). In response to receiving input to provide illumination, the node (200) turns on the visible light source (220) to provide said illumination and automatically transfers an output of the LiFi signal from the infrared light source (210) to the visible light source (220) by outputting the LiFi signal at said first one or more frequencies via the visible light source (220) for reception by said endpoint device (130), and turning off the infrared light source (210).

15 Claims, 4 Drawing Sheets

(58) Field of Classification Search
CPC .... H04B 10/116; H04B 10/40; H04B 10/502; H04B 10/516; H04B 10/2507; H04B 10/27
USPC ....... 398/118, 119, 127, 128, 129, 130, 131, 398/135, 136, 172, 158, 159, 183, 189, 398/124, 185, 186
See application file for complete search history.

(56) References Cited

U.S. PATENT DOCUMENTS

| | | | |
|---|---|---|---|
| 11,444,692 B2 * | 9/2022 | Rossius | H04B 10/116 |
| 2006/0056855 A1 * | 3/2006 | Nakagawa | G09F 9/33 |
| | | | 398/183 |
| 2008/0102893 A1 | 5/2008 | Shin et al. | |
| 2009/0208221 A1 * | 8/2009 | Sasai | H04B 10/116 |
| | | | 398/118 |
| 2009/0297167 A1 | 12/2009 | Nakagawa et al. | |
| 2021/0194585 A1 * | 6/2021 | Afgani | H04B 10/60 |

* cited by examiner

LIFI POWER MANAGEMENT

CROSS-REFERENCE TO PRIOR APPLICATIONS

This application is the U.S. National Phase application under 35 U.S.C. § 371 of International Application No. PCT/EP2021/050271, filed on Jan. 8, 2021, which claims the benefit of European Patent Application No. 20151370.2, filed on Jan. 13, 2020. These applications are hereby incorporated by reference herein.

TECHNICAL FIELD

The present disclosure relates to a node for use in a LiFi system.

BACKGROUND

Light Fidelity (LiFi) refers to techniques whereby information is communicated in the form of a signal embedded in light (including for example visible light, or infrared light) emitted by a light source. A signal is embedded by modulating a property of the light, examples include modulating the intensity of the light (amplitude modulation, frequency modulation, etc.), modulating the wavelength of the light (phase shift modulation, etc.). In a specific example, the wavelength of the electrical modulation is in the range of 3-300 meters. A phase shift applied to the signal may be on the scale of a few nanometers.

United States patent application US2009/0297167 A1 discloses an illumination light communication device that allows for communication using either illumination light and/or infrared light, when the main illumination function is turned off.

SUMMARY

According to a first aspect disclosed herein, there is provided a node for use in a LiFi system to provide LiFi signals to at least one endpoint device, the node comprising: a visible light source for emitting modulated visible light and non-modulated visible light to provide illumination; and an infrared light source for emitting modulated infrared light; wherein the node is configured to: output a LiFi signal at a first one or more frequencies via the infrared light source for reception by said at least one endpoint device; and wherein the node is configured to, in response to receiving input to provide illumination, when transmitting the LiFi signal via the infrared light source, turn on the visible light source to provide said illumination and automatically transfer an output of the LiFi signal from the infrared light source to the visible light source by: outputting the LiFi signal at said first one or more frequencies via the visible light source for reception by said at least one endpoint device; outputting an indication via at least one of the infrared light source and the visible light source, an indication that output of the LiFi signal will be transferred to the visible light source; and turning off the infrared light source.

In an example, the automatic transferring of said output of the LiFi signal comprises: outputting, via the infrared light source, an indication that output of the LiFi signal will be transferred to the visible light source. By means of the indication the communication partner, here the at least one endpoint device, is informed of the intent to switch from the infrared light source to the visible light source. In line therewith the at least one endpoint device can make preparations to continue receipt of the LiFi signal that it may receive from the visible light source.

Communication with endpoint devices generally will be bidirectional. Although the use of visible light as well as infrared light for the downlink signal is generally not objectionable; the uplink traffic will typically be in the infrared spectrum. The underlying rationale being that this is beneficial because the light used for the uplink then will not cause "light pollution" resulting from visible light sources in endpoint devices. As the invention proposes to change, the downlink, the at least one endpoint device, can easily acknowledge the receipt of the indication.

In an example, the automatic transferring of said output of the LiFi signal comprises outputting the indication using the infrared light source prior to outputting the LiFi signal at said first one or more frequencies via the visible light source and turning off the infrared light source. In this manner the at least one endpoint for which the LiFi signal is intended is enabled to prepare for switching. By using the infrared signal, the indication can be interleaved amongst other information destined to the at least one endpoint device. Preferably, when full synchronization is desirable, the node may wait with turning off the infrared signal until after an acknowledgement of receipt of the indication from the endpoint, in that manner the transition to visible light communication may be further streamlined.

In an example, the automatic transfer of said output of the LiFi signal additionally or alternatively comprises: outputting, via the visible light source, an indication that output of the LiFi signal will be transferred to the visible light source. This is particularly useful if the indication is provided through a simplified wake up-signal (which may use a simpler modulation than the LiFi signal) that can be received by the at least one endpoint device's visible light receiver and trigger the handover to visible light based communication.

In an advantageous version of the above, the automatic transferring of said output of the LiFi signal comprises temporarily outputting the LiFi signal, via both the infrared light source and the visible light source prior to turning off the infrared light source. This is useful for reducing the likelihood of data loss as a result from the switch over, by allowing a temporary parallel transmission. Temporary here may for example be for a predetermined time period that allows safe transition without data-loss, or more alternatively until a message has been successfully communicated using the visible light communication link (which may e.g. be inferred from the receipt of an acknowledgement of receipt of a message from the at least one endpoint device). In one example, parallel transmission by the node allows the endpoint device to switch the input to the modulator in a gradual manner. For example, by during a fixed period, gradually, transferring from an output from its infrared photodetector to an output of its visible light photodetector. In this manner it may be possible to minimize the risk of packet loss in its connection with the node.

In an example, the node is configured to, in response to receiving a request for a high-speed LiFi signal, output the high-speed LiFi signal at a second one or more frequencies via the infrared light source, the second one or more frequencies comprising one or more frequencies higher than the first one or more frequencies.

In an example, the visible light source has a maximum modulation frequency, the first one or more frequencies being below the maximum modulation frequency and the second one or more frequencies being above the maximum modulation frequency.

In an example, the visible light source comprises a white LED having a phosphor coating.

In an example, the visible light source comprises a plurality of LEDs arranged in series.

According to a second aspect disclosed herein, there is provided a system comprising a plurality of nodes according to the first aspect or any example thereof.

In an example, the system comprises a user-operable switch constructed and arranged to generate said input for use by one or more of the plurality of nodes in response to operation by a user.

In an example, the system comprises a presence sensor constructed and arranged to generate said input for use by one or more of the plurality of nodes in response to detecting presence of a user. In an example, each of the nodes is configured to output the same LiFi signal at the first one or more frequencies via the respective visible light source.

In an example, the system comprises a controller configured to: determine at least one of the nodes as being within range of the endpoint device; control the determined at least one node to output the LiFi signal.

In an example, the controller is configured to control all nodes other than the determined at least one node to not output the LiFi signal.

In an example, the controller is configured to turn off all nodes other than the determined at least one node.

In an example, the controlling the determined at least one node comprises controlling the determined at least one node to output the LiFi signal using the infrared light source.

According to a third aspect disclosed herein, there is provided a method of outputting LiFi signals by a node of a LiFi system, the method comprising: outputting a LiFi signal at a first one or more frequencies via an infrared light source for reception by at least one endpoint device; and in response to receiving input to provide illumination, turning on a visible light source to provide said illumination and automatically transferring an output of the LiFi signal from the infrared light source to the visible light source by: outputting the LiFi signal at said first one or more frequencies via the visible light source for reception by said at least one endpoint device; and turning off the infrared light source.

In an example, the automatic transferring of said output of the LiFi signal comprises: outputting, via the infrared light source, an indication that output of the LiFi signal will be transferred to the visible light source.

In an example, there is provided a node for use in a LiFi system, the node comprising: a visible light source for emitting modulated visible light; an infrared light source for emitting modulated infrared light; and a controller for controlling the visible light source and the infrared light source; wherein the controller is configured to: control the infrared light source to output a LiFi signal by emitting infrared light modulated at one or more first frequencies; and in response to receiving a command to turn on the visible light source, automatically transfer output of the LiFi signal from the infrared light source to the visible light source by controlling the visible light source to output the LiFi signal by emitting visible light modulated at the one or more first frequencies and turning off the infrared light source.

According to a fourth aspect disclosed herein, there is provided a computer program or computer program product comprising instructions configured so as, when executed by one or more processing units, to perform a method of outputting LiFi signals by a node of a LiFi system, the method comprising: outputting a LiFi signal at a first one or more frequencies via an infrared light source for reception by at least one endpoint device; and in response to receiving input to provide illumination, turning on a visible light source to provide said illumination and automatically transferring an output of the LiFi signal from the infrared light source to the visible light source by: outputting the LiFi signal at said first one or more frequencies via the visible light source for reception by said at least one endpoint device; and turning off the infrared light source.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
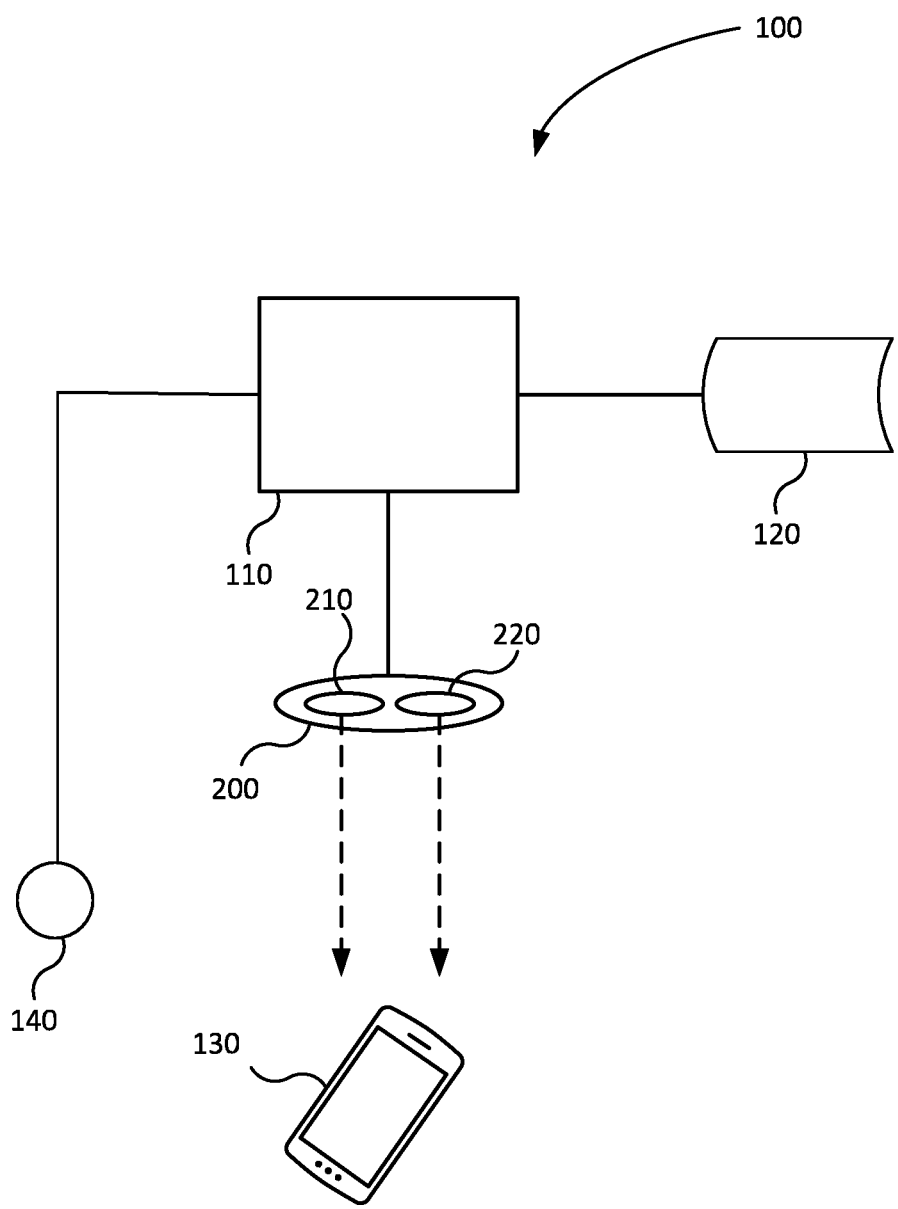
FIG. 1 shows schematically a first example of a LiFi system.

Examples described herein relate to Light Fidelity (LiFi) systems. LiFi refers to techniques whereby information is communicated in the form of signals embedded in light (including for example visible light, or infrared light) emitted by a light source and received at a light detector. A device comprising a light source for outputting modulated light for the purposes of transmitting LiFi signals may be referred to as a LiFi node, or simply "node".

A signal is embedded by modulating a property of the light, typically the intensity but alternatively or additionally the frequency or phase, according to any of a variety of suitable modulation techniques. A channel access scheme, such as for example time division multiple access (TDMA), frequency division multiple access (FDMA), code division multiple access (CDMA), etc., may be used to share the available channels between plural devices connected to the LiFi network.

The signal transmitted by the node comprises a sequence of bits or symbols which are encoded into the modulated light. The data rate (bit rate, symbol rate, etc.) of the signal depends on the frequency of the modulation, as well as other factors such as the signal-to-noise (SNR) ratio and the bandwidth. Hence, if a the light source being used for output of the signal is limited to a maximum frequency, then the data rate of the signal output from that light source will be similarly limited. For example, some types of white LED typically have a slow response due to phosphor conversion of light. These types of white LED, will have lower bandwidth and thereby lower data rate as also explained later below.

Depending for example on the particular wavelengths used, such techniques may also referred to as coded light, visible light communication (VLC) or free-space optical communication (FSO). In this context: visible light may be light that has a wavelength in the range 380 nm to 740 nm; and infrared light may be light that has a wavelength in the range 740 nm to 1.5 mm. It is appreciated that there may be some overlap between these ranges.

Information in the LiFi coded light emitted by the node can be detected using any suitable light sensor. For example, the light sensor may be a photodiode. The light sensor may be a dedicated photocell (point detector), an array of photocells possibly with a lens, reflector, diffuser or phosphor converter (for lower speeds), or an array of photocells (pixels) and a lens for forming an image on the array. The light sensor may be a dedicated photocell included in a dongle which plugs into a user device such as a smartphone, tablet, e-book, or laptop. In any case, this may enable an application running on a device to receive data via the light.

When visible wavelengths of light are used, a modulated visible light output by the node will also provide illumination. That is, the modulated visible light can provide the dual functionality of LiFi signal transmission and illumination. In particular, the modulation may be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so a human user only perceives the overall illumination and not the effect of the data being modulated into that illumination. In contrast to visible light, infrared light is not visible by humans. This means that while modulated infrared light can provide the functionality of LiFi transmission, it does not provide any illumination.

Examples described herein relate to optimizing power consumption in a LiFi node having both a visible light source and an infrared light source.

FIG. 1 shows schematically a first example of a LiFi system 100 according to the present disclosure. The LiFi system 100 comprises a node 200 and a controller 110. Also shown is an endpoint device 130, a data source 120, and an input device 140. The controller 110 is operatively coupled to the node 200, the data source 120, and the input device.

The node 200 comprises a visible light source 220 for emitting visible light and an infrared light source 210 for emitting infrared light. The visible light source 220 may be, for example, one or more visible light emitting diodes (LEDs) of one or more different colors, blue LEDs with integrated or remote phosphor to realize white light. The infrared light source 210 may be, for example, an infrared LED.

In yet further examples, the infrared light source 210 or visible light source 220 (or both) could be a LASER (light amplification by stimulated emission of radiation) light source 210, or simply "laser". Examples include, visible-wavelength laser diodes, infrared-wavelength laser diodes, visible-wavelength VCSELs (vertical-cavity surface-emitting lasers), infrared VCSELs, and other types of laser-based illumination (visible) light sources and/or laser-based infrared light sources etc. Use of laser light sources for optical wireless communication is known to suffer the least from data rate limitations when it comes to visible light sources. This makes laser light sources excellent for FSO when laser safety requirements can be fulfilled.

The node 200 is constructed and arranged to output LiFi signals for reception by the endpoint device 130. In particular, the node 200 is constructed and arranged to output visible LiFi signals by emitting modulated visible light using the visible light source 220 and/or to output infrared LiFi signals by emitting modulated infrared light using the infrared light source 210. Two configurations of the node 200 are possible: a SISO (Single Input Single Output) configuration; and a MIMO (Multi Input Multi Output) configuration.

In the SISO configuration, the node 200 may, at any given time, output only visible LiFi signals, or output only infrared LiFi signals (but not both). An example circuit of a SISO configuration is described below in relation to FIG. 3.

In the MIMO configuration, the node 200 may, at any given in time, output only visible LiFi signals, output only infrared LiFi signals, or may output both visible and infrared LiFi signals. Hence, the node 200 may provide LiFi signals using one or more of a visible LiFi channel (using the visible light source 220) and an infrared LiFi channel (using the infrared light source 210). An example circuit of a MIMO configuration is described below in relation to FIG. 4.

The endpoint device 130 may be, for example, a smart phone, a tablet computer, an electronic book (e-book), a laptop computer, etc. The endpoint device 130 comprises one or more LiFi receivers for receiving and demodulating LiFi signals from the nodes. For example, the endpoint device 130 may comprise a visible light receiver for receiving LiFi signals emitted by the node 200 via visible light, and an infrared light receiver for receiving LiFi signals emitted by the node 200 via infrared light. In other examples, the endpoint device 130 may comprise a single receiver for receiving both visible and infrared LiFi signals.

The sending of LiFi signals from the node 200 to the endpoint device 130 may be referred to as the "downlink". The endpoint device 130 and node 200 may also provide for an "uplink" in which the endpoint device 130 transmits LiFi signals for reception by the node 200. In such cases, the endpoint device 130 comprises one or more LiFi transmitters and the node 200 comprises one or more LiFi receivers in a corresponding manner to described in relation to the downlink. Alternatively or additionally, the endpoint device 130 may transmit data to the LiFi network using a separate communication channel, e.g. Bluetooth or WiFi.

The controller 110 is constructed and arranged to control the node 200 to selectively output LiFi signals using one or more of the visible light source 220 and the infrared light source 210. This is explained in more detail below.

In FIG. 1, the controller 110 is illustrated schematically as a functional block for the purposes of illustration. The controller 110 may be implemented in software, hardware or a combination of both software and hardware. For example, the controller 110 may be implemented as software running on a processor configured to perform the steps described herein. The controller 110 may be implemented separately from the node 200, for example as illustrated in FIG. 1, or may be implemented in the nodes 200. In examples described later in which there is more than one node 200, the controller 110 may also be implemented in a distributed manner, e.g. across all the nodes 200.

Typically, the node 200 may be installed in an environment. The environment may be, for example, an office, a library, a classroom, etc. When the visible light source 220 of the node 200 is active (ON and either modulating or not modulating), the node 200 provides illumination within the environment. Illumination may be, at a particular point in time, wanted or unwanted. For example, there may be one or more users within the environment who may desire illumination for the purposes of performing a task (e.g. a night time), or may not require illumination by the node 200 if, for example, there is already sufficient illumination in the form of ambient or natural light (e.g. through a window).

The controller 110 is configured to control the visible light source 220 turn the illumination ON or OFF in response to input. The input may be received from the input device 140 or may be received from the endpoint device 130. The input device 140 is one or more of a switch, a presence (or movement) sensor, and a timer. The input device 140 is constructed and arranged to generate input indicating that the illumination should be activated, and to provide this input to the controller 110.

Hence, in a first specific example, the input device is a switch within the environment which can be operated by a user in order to instruct the controller 110 to turn the illumination ON or OFF. As a second specific example, the input device 140 is a timer configured to automatically instruct the controller 110 to turn the illumination ON or OFF at specific times (e.g. OFF during daylight hours and ON during night time hours). As a third specific example, the input device 140 is a movement or presence sensor for detecting movement or presence (e.g. of a user) configured to automatically instruct the controller 110 to turn the illumination ON in response to input from the presence sensor indicating presence. The controller 110 may be configured to automatically turn the illumination OFF in response to determine that presence has not been detected by the presence sensor for a predetermined length of time.

The controller 110 is configured to control the node 200 to output data as LiFi signals embedded into the light output by the visible light source 220, the infrared light source 210, or (in the MIMO configuration) both. For example, the controller 110 may receive data from data source 120 and control either or (in the MIMO configuration) both of the visible light source 220 and the infrared light source 210 to output the data from the data source 120 by modulating their light output. Here, the data source 120 is intended to represent any source of data such as a local data storage or memory, or a remote data storage such as a server accessible by the controller 110 via a network. In a specific example, the controller 110 may be configured to receive data from a server via the Internet. The data itself may be, for example, a video file, an audio file, a website, or any other data.

In contrast to electrical fields, the light output cannot be negative (the minimum amount of light is zero). Because of this, LiFi signals are generated by modulating the light output relative to a bias light output level. For LED light sources, for example, this means that a bias current is provided through the LED. In typical frontends this bias current is adjusted to be about 50-55% of the nominal LED current. For LEDs, it is particularly important to provide a sufficiently high bias current in order to avoid distortions in the produced light due to the fact that LEDs have a nonlinear Current versus Voltage relation. In any case, the requirement for a bias light output level leads to a constant flux production from bias current even when no actual data needs to be transported. In a typical optical frontend (OFE) a current driver sends modulated DC current through the light source to cause the light source to emit light with a modulated light intensity over time.

A typical frontend will at least require 1-3 W electrical power per active light source. For the visible light source 220, this power is used to generate visible light which can provide illumination within the environment even when not modulated. That is, it is beneficial in employing the visible light source 220 (e.g. a white LED or a mixture of different coloured LEDs generating a white illumination) in order to have actual use of the generated flux. This is especially useful as typically the spaces where people would like to use mobile LiFi data and already desire illumination because no additional power consumption would be caused.

Infrared light, on the other hand, is not visible to humans. While this does have the benefit of glare free transmission, it is not eco-friendly when compared to visible light modulation because the bias light output level for the infrared light source 210 does not provide the secondary effect of illumination.

Hence, in a first example, the node 200 is in a state in which the infrared light source 210 is being used to output a LiFi signal, and the visible light source 220 is inactive. Then, when the controller 120 receives input indicating that illumination is to be turned ON (e.g. via a switch, presence sensor, or timer as mentioned above), the controller 120 activates the visible light source 220 in order to provide the illumination. Additionally, the controller 120 automatically transfers output of the LiFi signal (currently being output by the infrared light source 210) to the now active visible light source 220. To do so, the controller 120 controls the visible light source 220 to emit visible light modulated to encode the same data (or same data stream) as was being output by the infrared light source 210. Then, the controller 120 controls the infrared light source 210 to turn OFF, thus saving power.

The endpoint device 130 may output an indication to a user of the endpoint device 130 indicating which of the visible channel or the infrared channel it is currently using. For example, such an indication may be provided to the user as a visual indication on a screen of the endpoint device 130, or via a light source on the endpoint device 130 such as an LED, or in an auditory form such as a sound emitted by a speaker associated with the endpoint device 130.

In general, the visible light source 220 may be in one of three states: OFF, ON (active but not modulating), or MOD (on and modulating). The infrared light source 210 may be in one of two states: OFF, or MOD (on and modulating). Hence, the node 200 in the MIMO configuration may be in one of six possible states as shown in Table 1.

TABLE 1

| (4) Visible: OFF Infrared: MOD | (5) Visible: ON Infrared: MOD | (6) Visible: MOD Infrared: MOD |
|---|---|---|
| (1) Visible: OFF Infrared: OFF | (2) Visible: ON Infrared: OFF | (3) Visible: MOD Infrared: OFF |

The behaviour of the controller 110 described above may be considered as an automatic transition from state (5) to state (3). That is, when in state (4), input to activate the visible light source 220 would cause a transition to state (5). The controller 110 is configured, in this eventuality, to automatically transition to state (3) rather than remain in state (5).

In the MIMO configuration, the transition may comprise an intermediate transition through state (6) in order to perform a handover from the infrared light LiFi signal to the visible light LiFi signal. For example, the controller 110 may control the node 200 to output, via the infrared light source 210, an indication that output of the LiFi signal will be transferred to the visible light source 220. The endpoint device 130 may then be configured to, upon receipt of the indication, prepare to continue receiving the LiFi signal via the visible light source 220 by, e.g., activating a visible light receiver. This may not be necessary in some cases, for example if the receiver used by the endpoint device 130 to receive infrared LiFi signals is also capable of receiving visible LiFi signals.

Note that, depending on the configuration (e.g. when the node 200 is in the SISO configuration), state (6) may not be possible.

Hence, in the SISO configuration, the transition may comprise re-establishing the connection between the node 200 and the endpoint device 130. This may be required due to, for example, sudden changes in signal to noise ratio, or loss of link/synchronization during a small glitch of transition.

The above has been described with reference generally to a visible light source 220 and an infrared light source 210 which have the same output capabilities in terms of the frequencies at which they can modulate their light outputs. That is, a LiFi signal being output by the infrared light source 210, at any modulation frequency, may be transferred to the visible light source 220 and continue to be output at the same modulation frequency. However, some types of visible light source 220 are only capable of outputting lower-speed LiFi signals (lower than are possible using infrared light source 210).

Hence, in some examples, the visible light source 220 may be capable of outputting LiFi signals at a first one or more frequencies and the infrared light source 210 may be capable of outputting LiFi signals a second one or more frequencies, the second one or more frequencies comprising one or more frequencies higher than the first one or more frequencies.

As mentioned above, the frequency capabilities of a light source has an impact on the data rates (bit rates, symbol rates, etc.) which that light source is able to put out. The actual data rate may also depend on other factors such as the signal-to-noise (SNR) ratio and the bandwidth. However, in general a limited frequency output means a limited output data rate. For example, the visible light source 220 may only be capable of generating LiFi signals at low to medium data rates (e.g. up to 60 Mbit data rates), whereas the infrared light source 210 may be capable of generating LiFi signals at low, medium, and high data rates (e.g. up to 1000 Mbit data rates). There are a variety of reasons for this, as explained below.

In a first example, the visible light source 220 may be a white LED which uses a phosphor layer to convert the light from a blue LED into a white light output. This required absorption and re-emission of photons by the phosphor layer essentially acts as a low-pass filter.

In a second example, visible light source 220 may comprise a plurality of individual LEDs (e.g. red, green, and blue LEDs), the light output of which combined to produce an overall white light output. The layout of these individual LEDs on a printed circuit board may prevent high frequency modulations. For example, a typically long series connection of LEDs mounted on materials with high thermal conductivity like metal clad printed circuit boards (MCPCB) may not easily allow getting high frequency currents into the LEDs efficiently. This type of frequency limitation may apply even when the light sources (e.g. LEDs) themselves would be capable of outputting high frequency modulations, which can be the case for example with some types of laser-based light source.

The infrared light source 210, on the other hand, does not suffer so much from the same frequency (and hence data rate) limitations as the visible light source 220 such as those mentioned above. That is, the infrared light source 210 is capable of generating LiFi signals at high frequencies (in addition to the same low or medium frequencies as the visible light source 220).

It is understood that the transmission of the LiFi signal via the visible light source 220 and the infrared light source 210 may typically be in the baseband. This means that the higher speed transmission does comprise frequency components that are higher than the frequency components of the lower-speed signal, but not that all components are necessarily higher. That is, the second one or more frequencies may also comprises some or all of the first one or more frequencies.

In the MIMO configuration, the baseband may use two separate channels. These channels may be separated by frequency e.g. low bandwidth 1 MHz-10 MHz for visible light and higher frequency bandwidth 20 MHz-50 Mhz for infrared. Alternatively, separation of the channels can also be done by means of wavelength (emitter wavelength and optical wavelength filters in front of photo diode). In such cases, when wavelength separation is applied, the bandwidth of visible light may be lower than that of infrared. In contrast, for the SISO configuration, only one of the visible or infrared channels will be used at any given moment in time. In any case, the baseband may change the modulation bandwidth based on the bandwidth of the optical link. Typically, the infrared channel may have a higher bandwidth compared to the visible channel. If the same bandwidth is applied to both channels, the electrical modulation depth will be the same, but the modulation depth of visible light will be compromised (the electrical modulation bandwidth needs to be decreased in order to maximize the optical modulation depth). Thus, in some examples there may be some overlap between the frequencies (capable of being) output by the infrared light source 210 and the visible light source 220. However, it is beneficial to optimize bandwidth for maximum modulation depth and/or maximum throughput.

In view of the above, it is understood that the visible light source 220 may be in one of the three states similar to mentioned earlier: OFF, ON (active but not modulating), or LOW (on and modulating at a low frequency). The infrared light source 210 may be in one of three states: OFF, LOW (on and modulating at a low frequency), or HIGH (on and modulating at a high frequency). Hence, the node 200 in these examples may be in one of nine possible states as shown in Table 2.

TABLE 2

| (7) | (8) | (9) |
|---|---|---|
| Visible: OFF | Visible: ON | Visible: LOW |
| Infrared: HIGH | Infrared: HIGH | Infrared: HIGH |
| (4) | (5) | (6) |
| Visible: OFF | Visible: ON | Visible: LOW |
| Infrared: LOW | Infrared: LOW | Infrared: LOW |
| (1) | (2) | (3) |
| Visible: OFF | Visible: ON | Visible: LOW |
| Infrared: OFF | Infrared: OFF | Infrared: OFF |

States one to six correspond to those described earlier in relation to Table 1. The current examples introduce an additional three states (seven to nine) in which the infrared light source 210 is used to provide a high-frequency (high data rate) LiFi signal. The visible light source 220 is not capable of providing such a high-frequency signal and therefore whenever higher data rate demand comes up, the infrared light source 210 gets activated.

As mentioned above, the endpoint device 130 may output an indication of which channel is currently being used. Hence, the user is informed of whether the endpoint device 130 currently operates on white with low bandwidth or on IR with increased bandwidths. Such a feedback can beneficially be an optical signal on the receiver side (e.g. a signalling LED). In some examples, the infrared and visible signals may be separated, e.g., by means of one or more optical filters, TDMA, CDMA, etc. In the MIMO configuration, both signals can be used in parallel. In SISO configuration, a simple (e.g. AC-power) detector circuit could determine the presence of infrared and/or visible signals. This can allow a determination as to which data to feed towards the endpoint device 130 or control unit 110.

In some examples, the controller 110 is configured to, in response to receiving a request for a high-speed LiFi signal, activate the infrared light source 210 to output the high-speed LiFi signal. The request may be, for example, received from the endpoint device 130. The activation of the infrared light source 210 for providing the high-speed LiFi signal is performed independently of whether or not the infrared light source 210 was previously active and outputting a low-speed LiFi signal, and also independently of whether the visible light source 220 is currently on or off. In this way the standby situations can be managed without any addition Power consumption.

In some examples, the request for high-speed LiFi from the endpoint device 130 may be explicit. For example, when higher network speed is required, the end point device 130 may transmit a command to add the infrared channel. The command may be sent, for example, though the visible channel (low data rate LiFi link) or through another communication path such as the Internet. In any case, the received command will cause the controller 110 to activate modulation for the infrared channel.

Alternatively, or additionally, the request for high-speed LiFi from the endpoint device 130 may be implicit. For example, if the endpoint device 130 transmits a LiFi signal to the node 200 via an infrared channel whilst only the visible channel of the node 200 is active, the node 200 may determine that the endpoint device 130 is requesting high-speed LiFi.

In another example, the switch over to white channel use and deactivation of the infrared channel may be triggered by means of movement/presence detectors. This will guarantee that high data rate is available whenever movement/presence is detected in the space or the related zone of a room.

However the determination is made to activate the high data rate infrared channel, it may be implemented by, e.g.: enabling and/or disabling the dc bias current of the LED (white/IR); enabling and/or disabling the modulation signal to the modulator (white/IR) (this is applicable for MIMO); and/or having white and IR LEDs that are supplied by a single dc current and a single modulation current. By shunting (short circuiting by a switching element) a selection can be made for white and/or IR LEDs. Please note that the shunting topology does not allow MIMO as the modulation current for both channels is the same as LEDs are in series.

As mentioned earlier, the visible light source 220 may only be capable of generating LiFi signals at low to medium data rates (e.g. up to 60 Mbit data rates), whereas the infrared light source 210 may be capable of generating LiFi signals at low, medium, and high data rates (e.g. up to 1000 Mbit data rates). Hence, in some examples, the controller 110 may receive a request for a LiFi connection at a specified data rate, and make the determination of which of the visible or infrared channels to use based on the specified data rate. For example, the controller 110 may favour the visible light source 220, and only activate the infrared light source 210 if the specified data rate requires so.

As mentioned, the node 200 may be configured in a MIMO configuration in which it is able to simultaneously output LiFi signals using both the visible light source 220 and the infrared light source 210.

In a first example MIMO configuration, the node 200 may use the visible light source 220 and the infrared light source 210 simultaneously to increase the data rate such that communication will continue when infrared beam is interrupted. For example, the digital base band may have separate channels (the infrared and visible channels) but where a single one of these channels is sufficient for communication (e.g. bi-directional communication). As individual channels, the throughput can increase or the link can be retained when one channel (optical link) is interrupted.

An additional benefit is that re-establishing the IR link may be quicker in the MIMO configuration than the SISO configuration when one of the MIMO channels remained functional. This is because establishing a new SISO link usually takes more time as link setting such as automatic gain control (AGC), constellation setting, authentication, etc. need to be negotiated and verified. A single interrupted MIMO link, on the other hand, picks up sooner as the other link remains functional for data. Thus, negotiations and verification process can be skipped for re-establishing the other MIMO link.

In a second example MIMO configuration, the node 200 may use the visible light source 220 and the infrared light source 210 simultaneously to reduce interference (e.g. between the uplink and the downlink).

Figure 2:
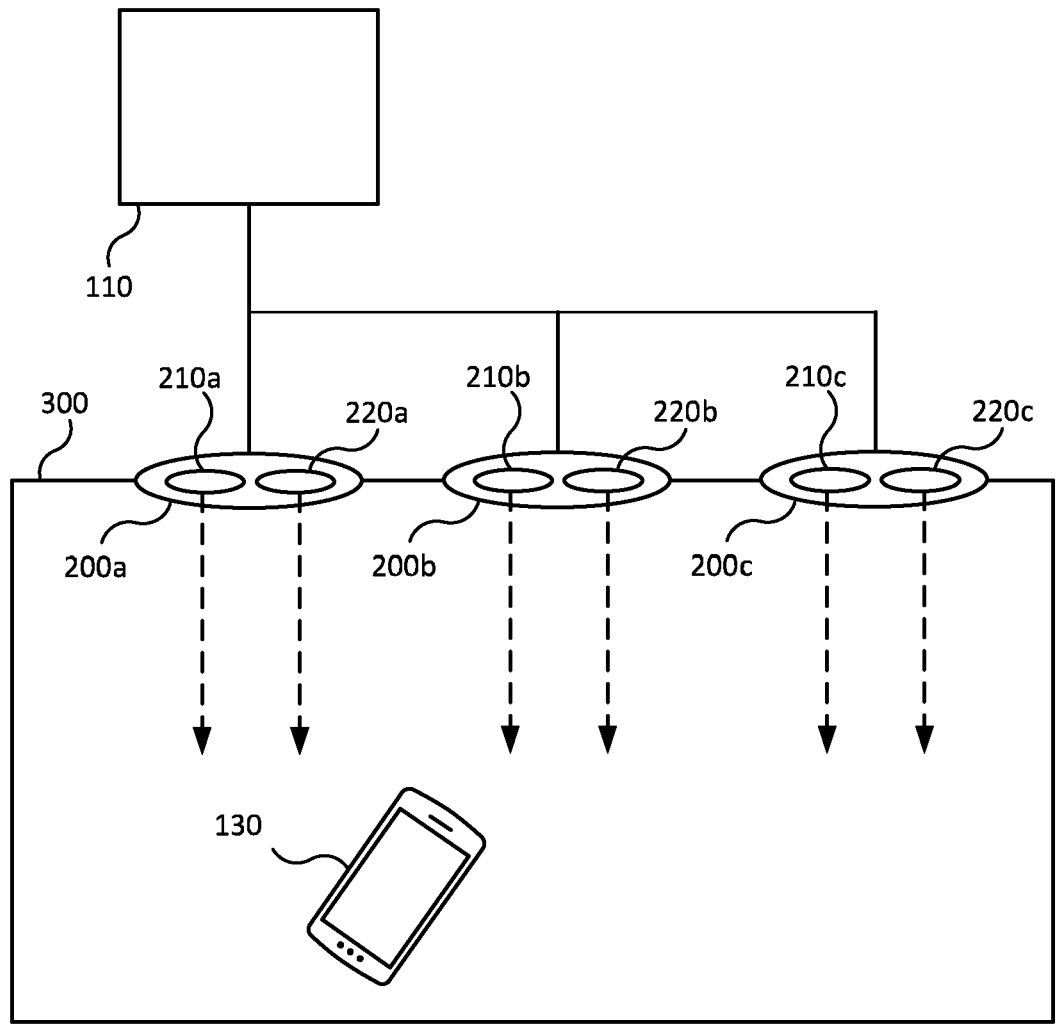
FIG. 2 shows schematically a second example of a LiFi system.

FIG. 2 shows schematically a second example of a LiFi system. In this example, there are a plurality of nodes 200a-c installed in an environment 300. Each node 200a-c is a node as described above in relation to FIG. 1. In this example, the controller 110 is implemented as a central controller which is operatively coupled to each of the nodes 200a-c. However, as mentioned above, the controller 110 may be implemented in a distributed manner, e.g. across two or more of the nodes 200.

In such an arrangement, if there is sufficient overlap between the one or more wavelengths of light used by the infrared light sources 210a-c of the nodes 200a-c, then there may be interference between these infrared channels. Similarly, if there is sufficient overlap between the one or more wavelengths of light used by the visible light sources 220a-c of the nodes 200a-c then there may be interferences between these visible channels. On the other hand, there is likely not sufficient overlap between the infrared wavelength(s) and the visible wavelength(s) for interference between one or more of the infrared channels and one or more of the visible channels.

Hence, in some examples, each of the nodes 200a-c is configured to output the same LiFi signal at the first one or more frequencies via the respective visible light source 220a-c. That is, the visible channel of all nodes 200a-c may be modulated with coherent modulation (modulation having the same phase and frequency). This has the advantage of flooding a larger portion of the environment 300 with the same, homogenous LiFi signal. This makes maximum use also of stray light and reduces chance of shadowing. Furthermore, the light from multiple nodes 200 can be added by the receiver at the endpoint device 130 which improves the signal-to-noise ratio even with very low flux level within the environment. It may be particularly advantageous in such examples to implement the controller 110 centrally. Each node 200 can then be connected to the controller 110 using the same length of the same type of cable.

This may be achieved by providing a single controller 110 for controlling a plurality of nodes 200 as shown in FIG. 2. Controllers 110 are relatively expensive compared to nodes 200. Therefore, equipping every node 200 with a controller 110 would increase the cost of the LiFi system. Therefore, advantage of outputting the same LiFi signal at the first one or more frequencies via the respective visible light source 220a-c is that fewer controllers 110 are required. In overlapping areas, the node signals add-up to improves signal to noise ratio. When nodes are equipped with own controller 110, the overlapping areas have deteriorated signal to noise ratio as signals may interfere (they cannot be added up).

A handover process may be required when endpoint 130 moves from one controller 110 to another controller 110. Hence, yet another benefit is that the end device(s) 130 can move around under the nodes 200 (that are connected with the same controller 110) without the need for hand-over.

In some examples, the controller 110 is configured to determine a location of the endpoint device 130. For example, a receiver at a node 200 may be configured to detect the direction from which a signal is received from the endpoint device 130. That node 200 may then be configured to emit its light output (either visible of infrared) in the same (return) direction.

In an alternative or additional example, the location of the endpoint device 130 may be determined using an IPS (indoor positioning system) e.g. by using of coded light. For example, the end device 130 may capture an image of the ceiling light source(s) 220 using an image capture device (e.g. camera of the endpoint device 130 such as a selfie cam). The endpoint device 130 may then determine its position based on the decoded message from the light source 220. For example, the endpoint device 130 may store information associating node 200 locations with the various codes. This information could also be stored in a back-end (e.g. controller 110 or a server of the LiFi system). Other resources such as accelerometers, compass, algorithms etc. could be used to improve positioning accuracy. The position information of end point 130 can be reported back to the controller 110 by means of the wireless network (e.g. by Radio Frequency or by the nearest controller, or by the large coverage low data-rate LiFi channel such that a directional high speed IR link can be set-up as explained with the cell).

The infrared light sources 210a-c may output modulated light in a directed beam. Each beam defines a "cell" within the environment. The endpoint device 130 can therefore only receive LiFi signals from one of the nodes 200a-c whilst the endpoint device 130 is located within the call of that node 200a-c (and the infrared light source 210a-c and/or visible light source 220a-c of that node 200a-c is currently active).

Hence, in some examples, the controller 110 is configured to determine the cell in which the endpoint device 130 is currently located. This may comprise the controller 110 determining a location of the endpoint device 130 and then determining the cell containing that location. In any case, the controller 110 may be configured to determine at least one of the nodes 200 as being within range of the endpoint device 130, and to control the determined at least one node 200 to output the LiFi signal. The controller 110 may then control all other nodes 200 to be in the OFF state, thus saving power.

In some examples, the controller 110 may control the one or more nodes 200 determined to be within range of the endpoint device 130 (i.e. the node(s) 200 of the cells in which the endpoint device 130 is currently located) to output the LiFi signal using the infrared light source 210.

In yet further examples, the infrared light source 210 of each node 200 produces a focused beam of modulated infrared light. In cases where the infrared light source 210 is capable of providing a higher-speed connection than the visible light source 220, this means that each node 200 provides a background data rate using the visible light source 220 and a focused beam of "peak" or improved data rate using the infrared light source 210.

The direction of the beam of modulated infrared light output by the infrared light source 210 may be steered using beam steering techniques. Hence, in some examples, the node 200 may steer the beam towards a specific endpoint device 130. To do so, the controller 110 may determine a location of the endpoint device 130 as mentioned above, and control one or more of the nodes 200 to steer the respective infrared beam towards the determined location of the endpoint device 130. One particular advantage of this is for cost. That is, large coverage is provided with visible light for more users while simultaneously high-speed link is provided within the complete coverage zone or a main zone like the meeting table by beam steering.

Another advantage of beam steering is that the risk of interference of multiple communications in parallel is mitigated. Yet another advantage of beam steering is the increased signal-to-noise ratio. Narrow beams in particular will have higher signal-to-noise ratio thus higher link budget at a lower power consumption even when the light might be visible and coming from e.g. coloured LEDs.

Figure 3:
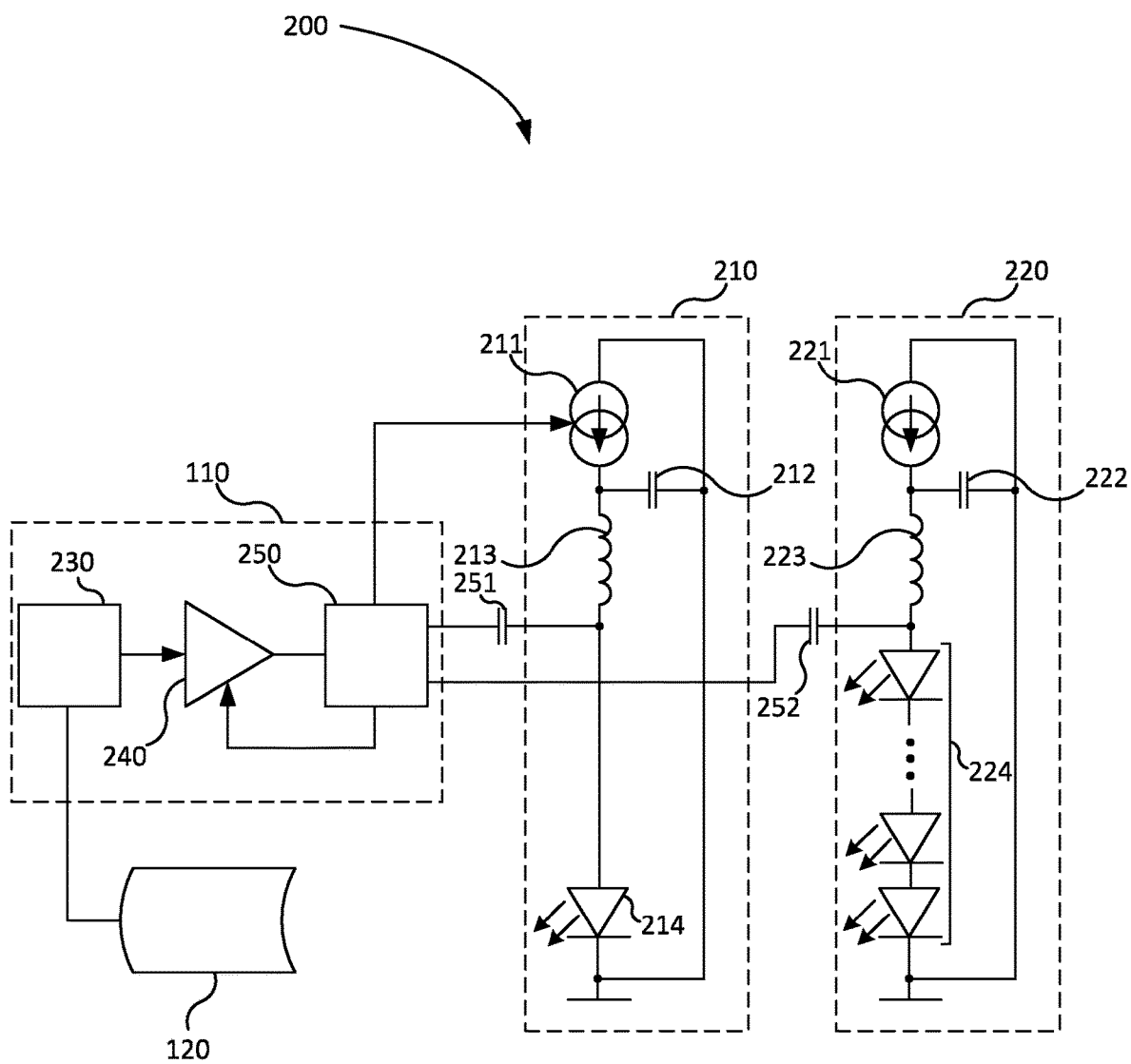
FIG. 3 shows schematically a first example node for use in a LiFi system.
Figure 4:
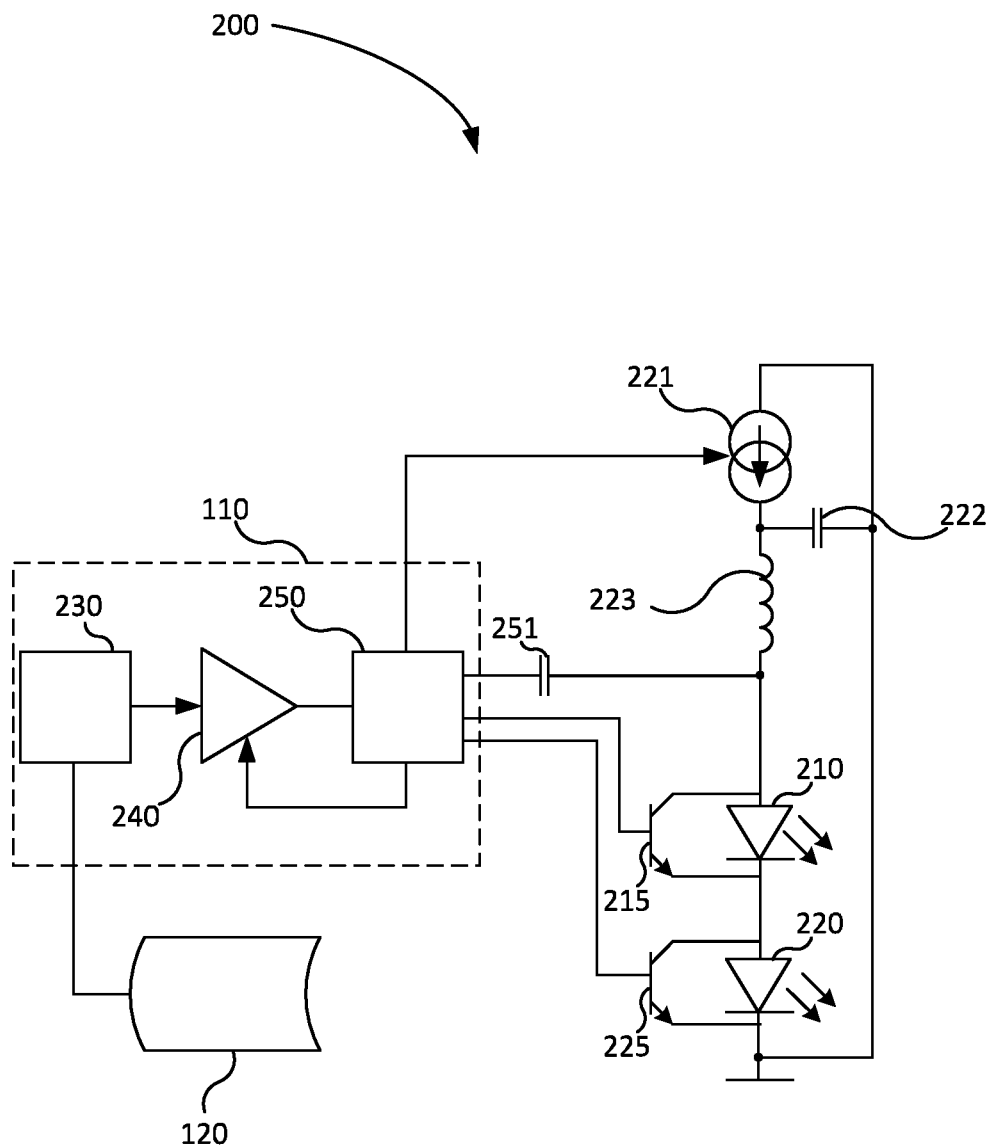
FIG. 4 shows schematically a second example node for use in a LiFi system.

FIGS. 3 and 4 illustrate schematically examples of the node 200 in more detail.

The circuitry shown in FIG. 3 is suitable for implementing a node 200 according to the SISO configuration. As mentioned above, in the SISO configuration, the node 200 is configured to use either the infrared light source 210 of the visible light source 220 at any given moment in time, but not both.

In this example, the visible light source 220 comprises a plurality of visible-light LEDs 224 and infrared light source 210 comprises an infrared LED 214. The elements shown in FIG. 3 may be integrated within a ceiling mounted luminaire.

The infrared light source 210 comprises a current source 211 for providing a DC current to the infrared LED 214. Hence, the infrared light source 210 comprises current loop consisting of current source 211 and the infrared LED 214. Also shown are filter elements 212, 213 which are arranged to decouple the DC current of the current source 211 from AC current due to the modulation (described below).

The visible light source 220 similarly comprises a current source 221 and filter elements 222, 223. However, in place of infrared LED 214, the visible light source 220 comprises an LED string 224. The LED string 224 is a plurality of visible-wavelength LEDs connected in series as shown in FIG. 3. Hence, the visible light source 220 comprises current loop consisting of current source 221 and the string of visible LED 224.

In this example, the controller 110 is implemented at the node 200. The controller 110 comprises, in this example, an encoder 230, an amplifier 240 and light source selector 250. The amplifier 240 is operatively coupled to the encoder 230. The light source selector 250 is operatively coupled to the amplifier 240. The light source selector 250 is operatively coupled to the infrared light source 210 via a first capacitor 251 and to the visible light source 220 via a second capacitor 252.

The encoder 230 is configured to receive data from the data source 120 and to encode the data to generate a modulation signal. The encoder 230 passes the generated modulation signal to the amplifier 240 The amplifier conditions the modulation signal and the light source selector 250 then selectively passes the conditioned signal to one or more of the infrared light source 210 and the visible light source 220. The respective first capacitor 251 and second capacitor 252 are used to couple only the AC component into the LED current loop in the respective light source.

In some examples, the light source selector 250 may be operatively coupled to the current source 211 of the infrared light source 210, as shown in FIG. 3, so that the light source selector 250 can switch off or otherwise deactivate the current source 211. The light source selector 250 may be similarly operatively coupled to the current source 221 of the visible light source 220, but this is not illustrated.

In some examples, the node 200 may be configured to selectively use either the visible light source 220 of the infrared light source 210 independence on a DC voltage offset present on a cable carrying the modulation signal (from the controller 110). For example, the node 200 may turn both light sources off in response to a 0 VDC offset, use the visible light source 210 for output of the LiFi signal in response to a 2 VDC offset, and use the infrared light source 220 for output of the LiFi signal in response to a 4 VDC offset.

In some examples, the light source selector 250 may be configured to provide a signal to the amplifier 240 in order to adjust the amplification parameters, e.g. in dependence on which one or more of the light sources 210, 220 is being used. In an alternative embodiment, a separate amplifier may be used for the visible light source 220. This is particularly advantageous as the driving of a long series connection of LEDs (as illustrated in the example of FIG. 3) requires a much higher driving voltage than for a single infrared LED.

The light source selector 250 is constructed and arranged to receive input from a source such as a switch or timer, as mentioned above. In response to receiving input, for example, to activate illumination, the light source selector 250 may activate the visible light source 220.

The light source selector 250 of the controller 110 is configured to identify cases of redundancy. In particular, the light source selector 250 may determine redundancy if the infrared light source 210 is being used to output a low-frequency LiFi signal and the visible light source 220 is currently active but only for the purposes of illumination (not LiFi). This situation is redundant because the visible light source 220 is capable of outputting the low-frequency LiFi signal while simultaneously providing illumination. In response to identifying this situation, the light source selector 250 transfers the LiFi signal to the visible light source 220 (by modulation the LiFi signal into the visible light) and deactivates the infrared light source 210.

The circuitry shown in FIG. 4 is suitable for implementing a node 200 according to the MIMO configuration. As mentioned above, in the MIMO configuration, the node 200 is configured to use the infrared light source 210, the visible light source 220, or both for the purposes of outputting a LiFi signal.

In this example, the infrared light source 220 is one or more infrared LEDs and the visible light source 210 is one or more visible light LEDs. The infrared light source 220 and the visible light source 210 are arranged in series with the current source 221 (i.e. they share a single current source). Filter elements 222, 223 may also be provided as described above.

The controller 110 comprises encoder 230 and amplifier 240 in a similar manner to as described above in relation to FIG. 3. The controller 110 also comprises a light source selector 250 which is operatively coupled to the infrared light source 210 and the visible light source 220 via a first capacitor 251. However, in this example, the light source selector 250 is also operatively coupled to (the gate of) a first transistor 215 and a second transistor 225.

The first transistor 215 straddles the infrared light source 210. The second transistor 225 straddles the visible light source 220. In this example circuit, the IR channel and the white channel are in a series connection only requiring a single current source. They are selectively modulated by shunting the current around the respective LEDs. Hence, in operation, the light source selector 250 can provide a voltage to the gate of either (or both) of the first transistor 215 and the second transistor 225, thereby effectively shorting the circuit around either (or both) of the infrared light source 210 and the visible light source 220, respectively. Hence, the light source selector 250 can selectively (de-)activate none, one, or both, of the infrared light source 210 and the visible light source 220.

That is, the controller 110 may comprise two outputs, a respective output for transmitting control commands to each of the infrared light source 210 and the visible light source 220. The controller 110 may be able to transmit control commands over each output concurrently, and thereby provide a MIMO configuration. Based on the modulation signal levels, node 200 can apply the DC bias to the infrared light source 210 and or visible light source 220.

In a further developed embodiment the current sources 211, 221 used to control and drive the LED bias current may be implemented in a way that they directly support insertion of the HF modulation signals e.g. by means of a current mirror circuit. That would also make the filter elements 212, 213, 222, 223 obsolete.

A wireless communication node according the present invention may also be used in conjunction with a sensor, such as a presence sensor or motion sensor as customarily used in illumination lighting systems when operating the illumination light. The wireless communication node will typically provide LiFi signals to at least one endpoint device, where the node comprises: a visible light source for emitting modulated visible light and non-modulated visible light to provide illumination; and an infrared light source for emitting modulated infrared light. Preferably the node is configured to be used in conjunction with a presence sensor and/or a motion sensor.

The node may be arranged to output a LiFi signal at a first one or more frequencies via the infrared light source or via a visible light source for reception by said at least one endpoint device; and wherein the node is configured to, in response to receiving input from the sensor, dependent on the state of the node; when providing illumination and not outputting the LiFi signal, switch on transmitting of the LiFi signal via the visible light source in conjunction with the illumination and when not providing illumination outputting the LiFi signal using either the visible light source or the infrared light source in dependence of the illumination requirements at the node.

When not providing illumination, the input from the presence sensor may be complemented with input from an illumination sensor; in this manner the node may, when not providing illumination and not outputting the LiFi signal, switch on transmitting of the LiFi signal via the infrared light source when the illumination sensor indicates that illumination is not required and switch on transmitting the LiFi signal via the visible light source when the illumination sensor indicates that illumination is required.

In the above example, the input from the presence (e.g. a motion) sensor may be advantageously used to, when there is no on-going communication using either the visible light source or the infrared light source, to switch on the data communication in dependence of the state of the node.

The signal from the presence or (motion) sensor represents an indication that a user is present, for communication it is particularly relevant when a user is present when (shortly) before there was no user present, as a newly detected user may be in need of data communication. Usage of the presence sensor may be particularly useful not only to reduce the power consumption for the illumination light (visible light source), but also to reduce the power consumption of the infrared light source. Thus when a user presence gets detected when there was no presence before this, on account of the line-of-sight nature of LiFi, provides a cue to wake-up the node's LiFi communication, so the node may start the LiFi signal transmission.

Where a new presence detection provides a trigger to wake-up the communication functionality, the lack of presence detection alone generally does not provide a good indication for placing the node in a low-power state (i.e. switching of the communication function). It is not uncommon for a user to leave a connected device unattended when data is being transferred. However, the absence of presence combined with absence of network communication for a predetermined minimum time period (possibly configurable), may combined provide a cue for suspending the LiFi communication function by the node and/or placing the node in a low-power state wherein no LiFi signal is being output.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory (including for example a solid-state drive or SSD).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM or ROM; a magnetic recording medium, such as a hard disk; or an optical memory device.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A node for use in a LiFi system to provide LiFi signals to at least one endpoint device, the node comprising:
   a visible light source for emitting modulated visible light and non-modulated visible light to provide illumination; and
   an infrared light source for emitting modulated infrared light;
   wherein the node is to configured to:
   output a LiFi signal at a first one or more frequencies via the infrared light source for reception by said at least one endpoint device; and
   wherein the node is configured to, in response to receiving input to provide illumination, when transmitting the LiFi signal via the infrared light source, turn on the visible light source to provide said illumination and automatically transfer an output of the LiFi signal from the infrared light source to the visible light source by:
      outputting the LiFi signal at said first one or more frequencies via the visible light source for reception by said at least one endpoint device;
      outputting at least one of a first indication via the infrared light source and a second indication via the visible light source, wherein the first indication and the second indication indicate that output of the LiFi signal will be transferred to the visible light source; and
      turning off the infrared light source.

2. The node according to claim 1, wherein the automatic transferring of said output of the LiFi signal comprises outputting the first indication using the infrared light source prior to outputting the LiFi signal at said first one or more frequencies via the visible light source and turning off the infrared light source.

3. The node according to claim 1, wherein the automatic transferring of said output of the LiFi signal comprises outputting both the first indication via, the infrared light source, and the second indication via the visible light source prior to turning off the infrared light source.

4. The node according to claim 1, wherein the node is configured to, in response to receiving a request for a high-speed LiFi signal, output the high-speed LiFi signal at a second one or more frequencies via the infrared light source, the second one or more frequencies comprising one or more frequencies higher than the first one or more frequencies.

5. The node according to claim 4, wherein the visible light source has a maximum modulation frequency, the first one or more frequencies being below the maximum modulation frequency and the second one or more frequencies being above the maximum modulation frequency.

6. The node according to claim 1, wherein the visible light source comprises a white LED having a phosphor coating.

7. The system comprising a plurality of nodes according to claim 1.

8. The system according to claim 7, comprising a user-operable switch constructed and arranged to generate said input for use by one or more of the plurality of nodes in response to operation by a user.

9. The system according to claim 7, comprising a presence sensor constructed and arranged to generate said input for use by one or more of the plurality of nodes in response to detecting presence of a user.

10. The system according to claim 7, wherein each of the nodes is configured to output the same LiFi signal at the first one or more frequencies via the respective visible light source.

11. The system according to claim 7, comprising a controller configured to:
 determine at least one of the nodes as being within range of the endpoint device;
 control the determined at least one node to output the LiFi signal.

12. The system according to claim 11, wherein the controller is configured to turn off all nodes other than the determined at least one node.

13. The system according to claim 11, wherein controlling the determined at least one node comprises controlling the determined at least one node to output the LiFi signal using the infrared light source.

14. A method of outputting LiFi signals by a node of a LiFi system, the method comprising:
 outputting a LiFi signal at a first one or more frequencies via an infrared light source for reception by at least one endpoint device;
 outputting at least one of a first indication via the infrared light source and a second indication via a visible light source, wherein the first indication and the second indication indicate that output of the LiFi signal will be transferred to the visible light source; and
 wherein the node, in response to receiving input to provide illumination, when transmitting the LiFi signal via the infrared light source, turning on the visible light source to provide said illumination and automatically transferring an output of the LiFi signal from the infrared light source to the visible light source by:
  outputting the LiFi signal at said first one or more frequencies via the visible light source for reception by said at least one endpoint device; and
  turning off the infrared light source.

15. The method according to claim 14, wherein the automatic transferring of said output of the LiFi signal comprises: outputting, via the infrared light source, an indication that output of the LiFi signal will be transferred to the visible light source.

* * * * *